(No Model.)

L. B. WRIGHT.
SIGN OR OTHER OBJECT.

No. 566,553. Patented Aug. 25, 1896.

Witnesses:
J. D. Garfield
H. S. Clemons

Inventor
Lewis B. Wright,
by Chapin
Attorneys.

UNITED STATES PATENT OFFICE.

LEWIS B. WRIGHT, OF SPRINGFIELD, MASSACHUSETTS.

SIGN OR OTHER OBJECT.

SPECIFICATION forming part of Letters Patent No. 566,553, dated August 25, 1896.

Application filed February 1, 1896. Serial No. 577,748. (No model.)

*To all whom it may concern:*

Be it known that I, LEWIS B. WRIGHT, a citizen of the United States of America, residing at Springfield, in the county of Hampden and State of Massachusetts, have invented new and useful Improvements in Illuminating Devices for Signs and other Objects, of which the following is a specification.

This invention relates to sign-illuminating devices for electric cars, and has for its object the illumination of the ordinary wood or metal signs usually carried by street-cars from a point in front or to one side of such signs; and it consists in the peculiar arrangement and construction of illuminating devices for that purpose, all as will be hereinafter described and claimed.

Figure 1:
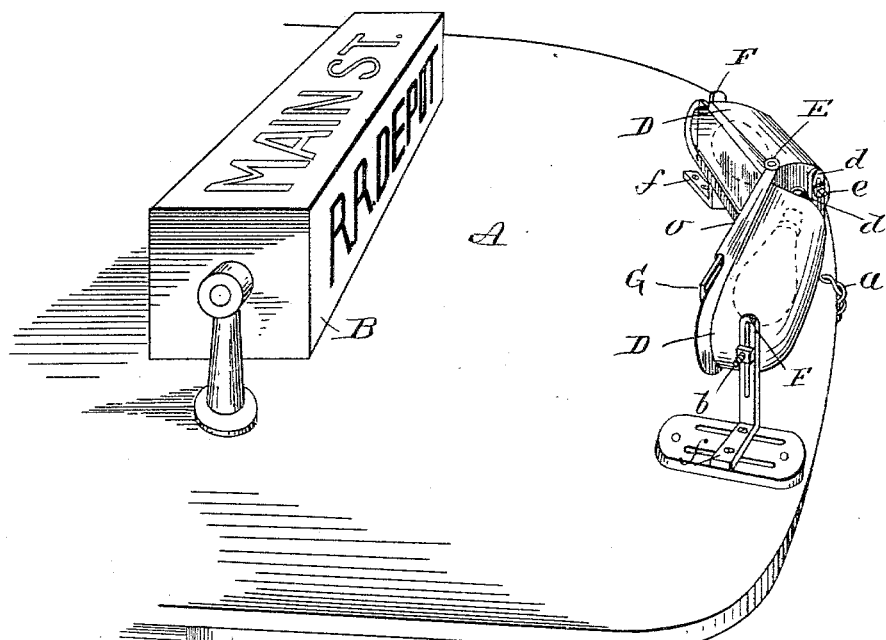
Figure 2:
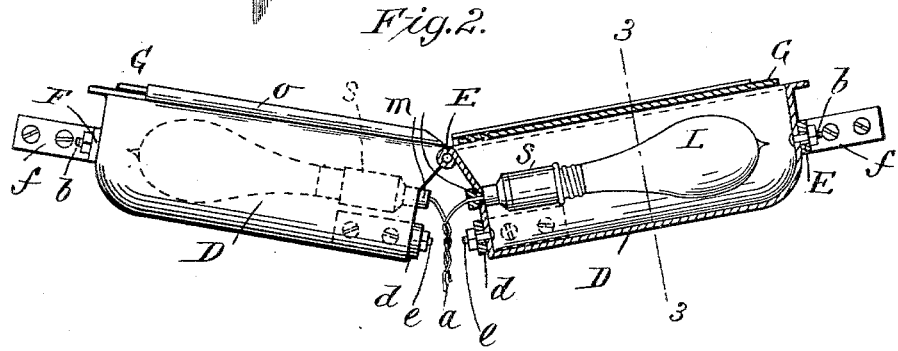
Figure 3:
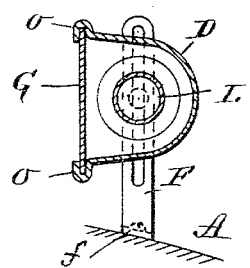

In the drawings forming part of this specification, Figure 1 is a perspective view of a portion of a street-car, showing the illuminating device attached to the roof thereof. Fig. 2 is a plan view of the device, partly in section, showing the position of the electric lamps therein. Fig. 3 is a cross-section taken on line 3 3, Fig. 2.

In the drawings, A represents the roof of a car having thereon the usual four-sided revoluble sign B. Secured to the roof of the car, in front of the said sign, is the illuminating device which is the subject of this invention; and it consists of the two parts D, made, preferably, of metal and hinged together at E. The shape of the said parts D is clearly shown in Figs. 2 and 3, they being substantially semitubular. The interior of said parts D is converted into a reflecting-surface by any of the well-known methods, as, for instance, by white-enameling or by nickel-plating.

The two parts are united by a hinge E, which permits of their adjustment at any desired angle relative to the face of the sign. The front face of each of the parts D is closed by a pane of glass secured thereto by the edges of the part D being turned over the edge of the glass on three sides thereof, one end being left free for the removal of said glass.

In each inner end wall, near the hinge E, is secured the insulated plug $m$, which projects sufficiently into the interior of the parts D to permit of securing thereon the lamp-sockets $s$ for the support of the electric lamps L, the wires $a$ for operating said lamps being led through a suitable aperture in each plug $m$, as shown.

The two parts D, hinged together, as described, are adjustably supported on the roof of the car at several points, as shown, by the slotted vertical standards $d\ d$ and F F by means of the bolts $b\ b$ and the outer ends of parts D and $e\ e$, on the inner contiguous ends thereof, said bolts being securely fixed in the said ends of said parts in any convenient way. By means of these slotted standards $d\ d$ and F F any angle which may be necessary to properly direct the light on the sign of a car may be given to the illuminating device.

In applying this device to the roofs of cars the two parts D are swung toward each other or with their glass-covered faces in line with each other, according to the width of the sign to be lighted up, and then adjusted to throw the light evenly between the upper and lower edges of the sign; and the two standards $d\ d$ are then so secured to the roof of the car by screws or bolts that the vertical slots therein shall engage the bolts $e\ e$ on the inner ends of the parts D, and the said parts D are then secured in position by turning up the nuts on the said bolts $e\ e$. The standards F F are then adjusted to the roof, so as to effect an engagement in the vertical slots of said standards of the bolts $b\ b$, and the nuts on said bolts are then turned up to a bearing, whereby the outer ends of parts D are secured to the standards F F, which, like standards $d\ d$, are secured to the roof of the car.

When the illuminating device is once secured to the roof of the car, the wires $a$ are taken to any convenient point therein and placed in the circuit with the other electric lights and provided with a suitable switch.

As at present arranged the signs showing the destination of a car are almost invisible after dark. Even the signs made of glass, behind which lights are placed, are not satisfactory, as the light is very strong at a point opposite the lamps and very weak at other points, whereas by the construction and arrangement shown and described herein the reflected light of the lamps is thrown upon an opaque sign, the eye of the beholder being shielded from the direct rays of light from the lamps by reason of their being inclosed in the metal parts D D, and hence the sign is as clearly seen as in daylight. The said two reflector parts are, by reason of their hinged connections and supporting devices, adapted to be adjusted to reflect a light in variable lines of divergence, whereby the rays of light emanating therefrom may be directed as described.

Having thus described my invention, what I claim, and desire to secure by Letters Patent, is—

1. A sign-illuminating device consisting of two reflectors, the open faces of which are adjustable to variable divergent lines, electric lamps in said reflectors, means for energizing said lamps, and suitable supports for said reflectors whereby horizontal and vertical adjustments may be given thereto, substantially as described.

2. A device for illuminating signs and similar objects consisting of two semitubular reflectors hinged end to end and each adapted to support an incandescent electric lamp therein, the open faces of which reflectors are adjustable to variable diverging lines opposite an object to be illuminated, and means for adjustably supporting said reflectors, combined with an electric lamp in each of said reflectors and suitable electric connections therefor, substantially as set forth.

LEWIS B. WRIGHT.

Witnesses:
H. A. CHAPIN,
K. I. CLEMONS.